(12) United States Patent
Gilad et al.

(10) Patent No.: US 11,887,289 B2
(45) Date of Patent: Jan. 30, 2024

(54) OCCLUSION KEY GENERATION

(71) Applicants: Oran Gilad, Herzliya Pituach (IL);
Samuel Chenillo, New York, NY (US);
Oren Steinfeld, Tel Aviv (IL)

(72) Inventors: Oran Gilad, Herzliya Pituach (IL);
Samuel Chenillo, New York, NY (US);
Oren Steinfeld, Tel Aviv (IL)

( * ) Notice: Subject to any disclaimer, the term of this patent is extended or adjusted under 35 U.S.C. 154(b) by 0 days.

(21) Appl. No.: 18/317,408

(22) Filed: May 15, 2023

(65) Prior Publication Data

US 2023/0368350 A1      Nov. 16, 2023

Related U.S. Application Data

(60) Provisional application No. 63/342,135, filed on May 15, 2022.

(51) Int. Cl.
| | | |
|---|---|---|
| G06T 7/194 | (2017.01) | |
| G06T 7/90 | (2017.01) | |
| G06T 5/50 | (2006.01) | |
| G06T 7/70 | (2017.01) | |

(52) U.S. Cl.
CPC ............... *G06T 5/50* (2013.01); *G06T 7/194* (2017.01); *G06T 7/70* (2017.01); *G06T 7/90* (2017.01); *G06T 2207/10024* (2013.01); *G06T 2207/20084* (2013.01); *G06T 2207/20221* (2013.01)

(58) Field of Classification Search
CPC .. G06T 7/194; G06T 7/70; G06T 2207/10024
See application file for complete search history.

(56) References Cited

U.S. PATENT DOCUMENTS

| | | | |
|---|---|---|---|
| 6,292,227 B1 | 9/2001 | Wilf et al. | |
| 10,015,531 B1 * | 7/2018 | Chenillo | .......... H04N 21/23424 |
| 2017/0223234 A1 * | 8/2017 | Do | .......... H04N 5/272 |
| 2017/0278289 A1 * | 9/2017 | Marino | ................... G06T 7/536 |
| 2019/0355128 A1 | 11/2019 | Grauman | |

* cited by examiner

*Primary Examiner* — Matthew Salvucci
(74) *Attorney, Agent, or Firm* — RosserIP, LLC; Roy Rosser

(57) ABSTRACT

A system and method of obtaining an occlusion key using a background pixel map is disclosed. A target image containing a target location suitable for displaying a virtual augmentation is obtained. A stream of current images are transformed into a stationary stream having the camera pose of the target image. These are segmented using a trained neural network. The background pixel map is then the color values of background pixels found at each position within the target location. An occlusion key for a new current image is obtained by first transforming it to conform to the target image and then comparing each pixel in the target location with the color values of background pixels in the background pixel map. The occlusion key is then transformed back to conform to the current image and used for virtual augmentation of the current image.

6 Claims, 5 Drawing Sheets

OCCLUSION KEY GENERATION

CROSS-REFERENCE TO RELATED APPLICATIONS

This is a non-provisional patent application of provision patent application U.S. Ser. No. 63/342,135 entitled "Occlusion Key Generation" that was filed on 15 May 2022, the contents of which are hereby incorporated by reference into the current application in their entirety.

BACKGROUND OF THE INVENTION

(1) Field of the Invention

This invention relates to video match moving, and more particularly to a method of generating an occlusion key for use compositing images into video.

(2) Description of Related Art

In video match moving, computer software may be used to artificially insert a graphic or image of an object into a video stream at the correct location and at the appropriate scale and orientation so that to a viewer of the video, the graphic or object appears to be located at the venue. If the event being videoed is a live event, players may for instance move past the position at which the virtual insertion is placed. To avoid the players being obscured by the object and destroying the illusion that the object is at the venue, the portions of the virtual insertion where the player is located must not be shown. This may, for instance, be accomplished using an image occlusion key or mask. The occlusion key differentiates pixels in the image into foreground pixels and background pixels. Foreground pixels are ones that must be shown instead of the virtual insertion, while the virtual insertion may be shown instead of the background pixels.

When the background is relatively simple, it may be possible to use chroma-keying, texture-based, motion-detection based or other computer vision techniques to produce acceptable occlusion keys or segmentation masks. But when the background is dynamic such as, for instance, a digital LED screen on the perimeter of a soccer or baseball field, those methods typically do not achieve good results.

Improved methods of obtaining occlusion keys are, therefore, desirable.

The relevant prior art includes:

U.S. Pat. No. 6,292,227 issued to Wilf et al. on 2001 Sep. 18 entitled "Method and Apparatus for Automatic Electronic Replacement Of Billboards In A Video Image" that describes an apparatus for automatic replacement of a billboard in a video image is provided. The billboard comprises a chroma-key surface, and the apparatus includes a video camera for viewing the billboard, and a chroma-key unit operative to detect at least one chroma-key color of the billboard chroma-key surface. A reference color of the chroma-key unit is adjustable to conform to the color of the chrom-key surface, thereby enabling the chroma-key unit to correctly identify the billboard surface and to correctly replace the chroma-key surface of the billboard by a virtual advertisement in a video image with correct occlusion of any foreground object.

US 2019/0355128 published by Grauman; Kristen on 2019 Nov. 21 entitled "Segmenting Generic Foreground Objects in Images And Videos" that describes a method, system and computer program product for segmenting generic foreground objects in images and videos. For segmenting generic foreground objects in videos, an appearance stream of an image in a video frame is processed using a first deep neural network. Furthermore, a motion stream of an optical flow image in the video frame is processed using a second deep neural network. The appearance and motion streams are then joined to combine complementary appearance and motion information to perform segmentation of generic objects in the video frame. Generic foreground objects are segmented in images by training a convolutional deep neural network to estimate a likelihood that a pixel in an image belongs to a foreground object. After receiving the image, the likelihood that the pixel in the image is part of the foreground object as opposed to background is then determined using the trained convolutional deep neural network.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive system and method of obtaining an occlusion key using a background pixel map is disclosed.

In a preferred embodiment, an operator may select a target location that may be a place in an event venue deemed suitable for displaying virtual augmentations, or graphics. A target image may then be obtained that positions the target location in a vicinity of the center of a video image, i.e., the camera being used to record the event may obtain an image in which the location of the virtual insertion may be centered and may appear at an appropriate size. The camera-pose of this target image may be recorded, i.e., relevant camera data such as, but not limited to, the pan, tilt, zoom and focus may be obtained and/or recorded.

An occlusion key may then be obtained using a background-pixel history map of the target location. This background-pixel history map may be obtained in the following manner.

A software module monitoring the images from the game video camera may receive a stream of current images. The software module may transform those images into ones that appear as if they were being viewed by the camera having the camera pose of the target image. These transformations may, for instance, be an homography between the current images and the target image. These transformed images may then form a stationary stream of images that are stationary in the sense that the pixels of the target location always appear at the same x, y pixel location in the image. The stationary stream of images may, therefore, be used to collect a history of the color of the pixels that occur at that pixel location over time.

The stationary stream of images may first be segmented into foreground and background pixels. Foreground pixels are ones that must be shown instead of the virtual insertion, while the virtual insertion may be shown instead of the background pixels. This segmentation may, for instance, be accomplished using a neural network that has been trained to recognize foreground objects such as, but not limited to, players, bats, and balls. Such neural networks can be trained relatively easily to produce segmentations that are not very accurate, but make very few false negatives, i.e., pixels identified as background pixels are very nearly always background pixels. The segmented stationary stream of images may therefore be used to create a background pixel map of the region of interest, i.e., a history of the color values of pixels that have been labeled as background pixels in the target location. As the players move around, over time every background pixel may become represented in the map.

When a new current or live image of the event is obtained, it may be transformed into a stationary image, and each pixel in the target location compared with the known, historical color values of background pixels found at that location. A determination may, therefore, be made as to whether each pixel in the target location in the current image should be a background or a foreground pixel and an appropriate occlusion key created.

This occlusion key may then be transformed back to the current image and used to augment the current image with a virtual augmentation or graphic.

Therefore, the present invention succeeds in conferring the following, and others not mentioned, desirable and useful benefits and objectives.

It is an object of the present invention to provide an efficient and accurate method of creating occlusion keys for complex backgrounds.

It is another object of the present invention to provide a method of creating occlusion keys whose accuracy may improve during the course of a broadcast.

DETAILED DESCRIPTION OF THE INVENTION

Figure 1:
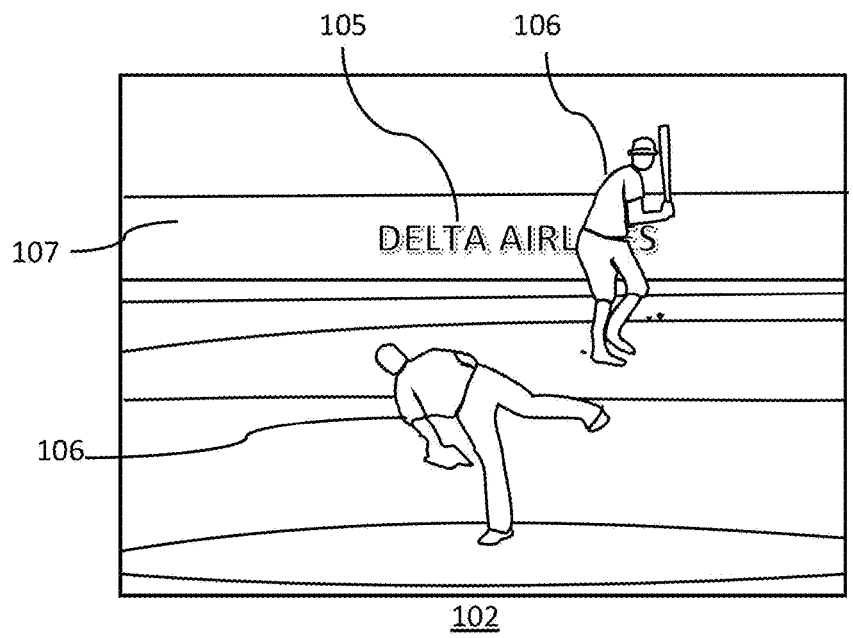
FIG. 1 shows a schematic representation of a video image of an event occurring at an event venue which has been augmented with a virtual augmentation.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic representation of a video image 102 of an event occurring at an event venue which has been augmented with a virtual augmentation.

As shown in FIG. 1, an event such as, but not limited to, a baseball game may be occurring at an event venue such as, but not limited to, a baseball field. The event may be recorded, or broadcast, using images taken with a suitable digital camera. The event broadcasters may be desirous of showing the broadcast viewers graphics or augmentations that are not at the event venue but which they would like viewers to think are at the game or part of the event venue. This may, for instance, be done using well-known match moving technology in which an image occlusion key may be used to ensure that while the virtual augmentation 105 appears to be in front of background objects 107, foreground objects 106, such as, but not limited to, the players, are not obscured by the virtual augmentation.

Figure 2:
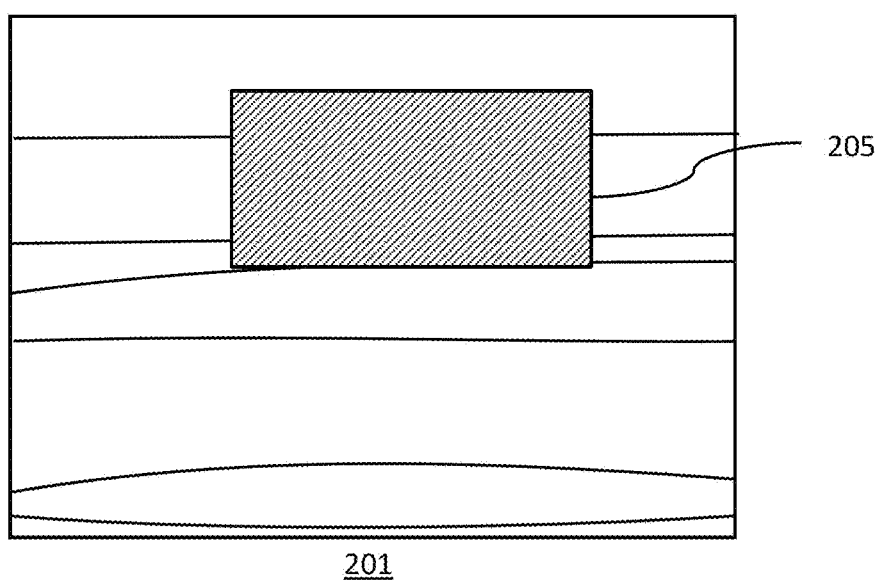
FIG. 2 shows a schematic representation of a target image of an event venue.

FIG. 2 shows a schematic representation of a target image 201 of an event venue.

The target image may be a view of the event venue taken with a broadcast video camera in which a target location 205 may be centrally located. The target location may be a location which has been determined as suitable for placing a virtual augmentation or graphic.

Figure 3:
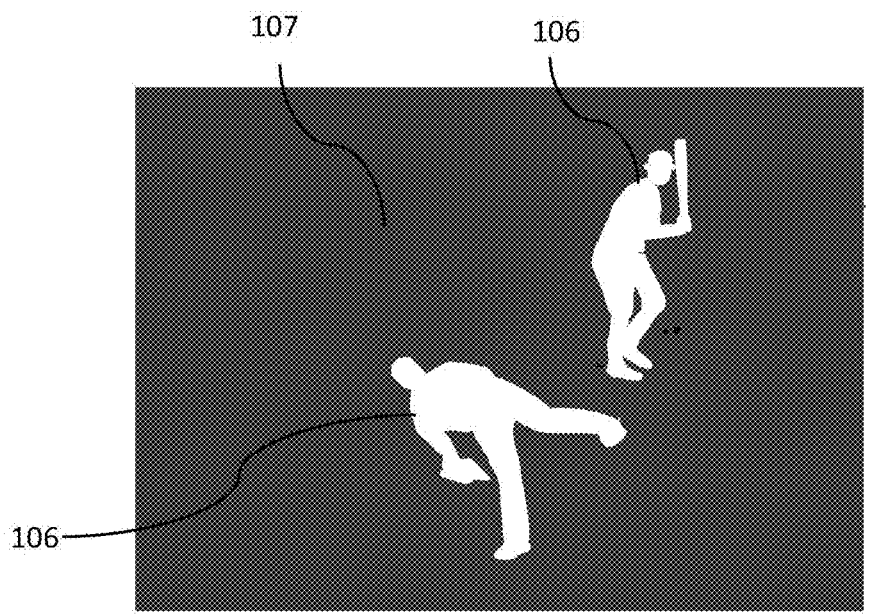
FIG. 3 shows a schematic representation of an image occlusion key.

FIG. 3 shows a schematic representation of a binary image occlusion key 300.

The image occlusion key differentiates between foreground pixels 106 that must be shown instead of the virtual insertion, while the virtual insertion may be shown instead of the background pixels 106. The image occlusion key has pixels that are typically referred to as alpha values. These alpha values are typically between 0 and 255, representing gray scale values from black (0) to white (255). These alpha values may be indicative of the amount of the underlying image that may be allowed to bleed through, or appear through, any virtual augmentation. An alpha value of 0 (black) typically means that the underlying image pixel is completely blocked, while an alpha value of 1 (white) typically means that the underlying image pixel is displayed rather than the virtual augmentation. A gradient alpha value, i.e., a value between 1 and 254, typically means that a percentage or fraction of the underlying image pixel is blended into the virtual augmentation. The amount of the underlying image that is blended in may, for instance, be proportional to the gradient alpha value.

The image occlusion key 300 shown in FIG. 3 may be a binary occlusion key in which background pixel regions 107 are given an alpha value of 0 or black indicating that the virtual insertion will be shown rather than the background pixel. Foreground pixel regions 106 are shown given a value of 255 or white indicating that the foreground pixels will be shown instead of the virtual augmentation.

Figure 4:
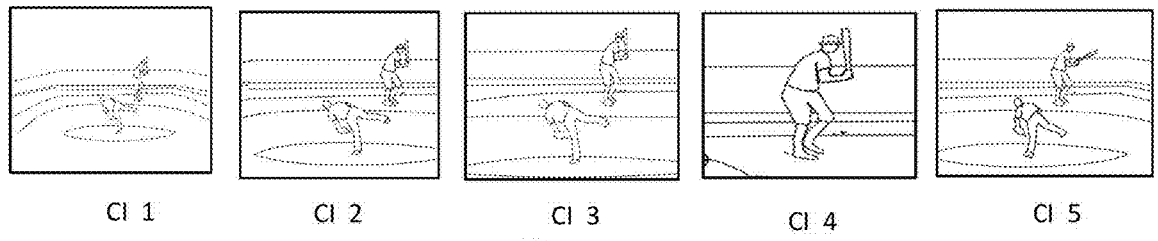
FIG. 4A shows a schematic representation of a stream of current images.
FIG. 4B shows a schematic representation of a stationary-stream of transformed current images.
FIG. 4C shows a schematic representation of a segmented image stream.
Figure 4:
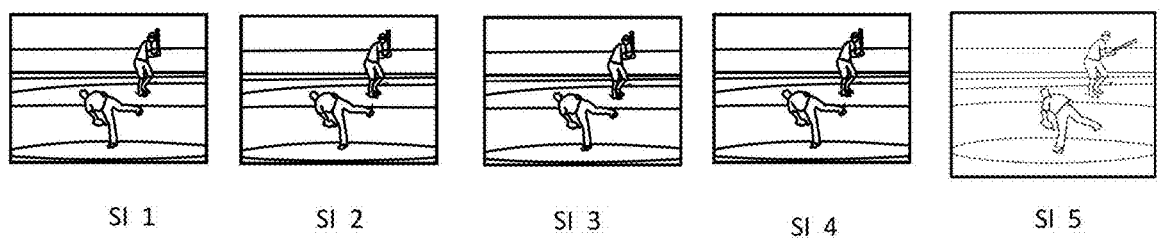
Figure 4:
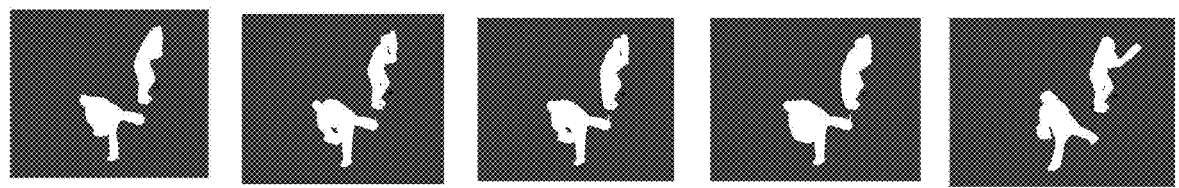

FIG. 4A shows a schematic representation of a stream 401 of current images.

The stream of current images 401 may, for instance, be sequential frames of footage of a game being played. Each of the frames, or current images (CI), may be taken with the recording camera having different camera parameters, i.e., different values of pan, zoom, tilt, focus and rotation. This may occur as the camera operator adjusts the camera parameter while attempting to capture the most appropriate view of the event as it unfolds.

FIG. 4B shows a schematic representation of a stationary-stream 402 of transformed current images.

Each of the images in the stationary-stream of images are transformed versions of the stream of current images. For instance, stationary image SI 1 is a transformed version of current image CI 1, SI 2 of CI2, . . . . SI 5 of CI 5. The transformation may, for instance, be an homography that transforms the current image into one taken with the same camera parameters used to obtain the target image having the region of interest. In this way, each pixel of the target location will have the same image coordinates in all of the stationary images in the stationary stream.

The homography may, for instance, be calculated using one of the well-known techniques such as, but not limited to, direct linear transformation" (DLT). This method involves finding a set of corresponding points in both images, and then solving a set of linear equations to determine the homography matrix that maps one set of points to the other. The DLT method requires at least 4 matching points between the images. These points may, for instance, be obtained automatically using feature matching algorithms such as, but not limited to, the Harris Corner Detector. This may operate by computing the "corner response" function for each pixel in an image, i.e., by measuring how much the image would change if it were shifted in any direction. Corners are identified as pixels with a high corner response, i.e., pixels have large local gradients.

To obtain an homography between two images, the system may automatically identify a set of corresponding points om each of the images. A set of linear equations in terms of the homography matrix described above may then be set up between the points. This set of linear equations may then be solved using well-known mathematical techniques such as, but not limited to, least squares or singular value decomposition. Once the homography matrix is obtained, it may be applied to all pixels of a first image to warp it into the same coordinate system as a second image.

Multiple sets of points, typically on the order of a hundred sets, may be used to estimate the homography. Each of the homographies obtained with these sets may contain errors. A consensus homography for the two images may be obtained using well-known methods such as, but not limited to, Random Sample Consensus (RANSAC). This may for instance involve selecting a random subset of data points (called the "inliers") and fitting an homography to these points. Then, the remaining data points (called "outliers") may be tested against the fitted homography to determine how many of these points are consistent with the homography within a certain predetermined threshold or tolerance. If the number of these exceeds the threshold, the model is considered a good fit for the data. Otherwise, a new random sample may be selected and the process repeated until a satisfactory model is found.

FIG. 4C shows a schematic representation of a segmented image stream 403.

Each of the images in segmented image stream are segmented versions of corresponding image in the stationary stream of images. For instance, SEG 1 is image SI 1 segmented into background and foreground pixels, SEG 2 is a segmented version of SI 2, . . . and SEG 5 is a segmented version of SI 5.

The segmentation may, for instance, be obtained using neural networks trained to recognize typical foreground objects. Typical foreground objects may depend on the nature of the source video onto which overlay images are to be placed. For instance, if the source video is of a game such as, but not limited to, baseball or soccer, the foreground objects may include baseball players, soccer players, umpires, referees, their uniforms, baseball bats, baseballs, and soccer balls.

Neural networks that may be used for object recognition in images include, but are not limited to, Convolutional Neural Networks (CNNs) and Recurrent Neural Networks (RNNs).

Convolutional Neural Networks (CNNs) may be trained using supervised learning. This typically involves exposing the CNN to large batches of labeled images representative of the objects to be identified. To obtain high recognition accuracy, hundreds to thousands of labeled images may need to be run through the system thousands of times. Obtaining and labeling the images may be time consuming and expensive. The amount of computation involved in the training may require substantial use of high-powered computers and may also be time-consuming and expensive. To reduce the cost of training, the neural network may be lightly trained, i.e., trained on a limited data set for a limited number of epochs such that the neural network is capable of recognizing selected objects but with an accuracy that may only differentiate individual pixels in range of 50% to 100%, or even in a range of 80% to 90%, of the time.

However, although the lightly trained CNN may not be very accurate, it produces fast segmentations that have very few false negatives, i.e., any pixel identified as a background pixel has a very high likelihood of actually being a background pixel.

As the players move around, each pixel in the region of interest will eventually be represented. Therefore, by combining the color values of background pixels represented in each of the segmented image stream, a map of all the background pixel color values for each of the pixels in the target location may be obtained and used to form a background pixel map of the region of interest.

The background pixel map may be obtained over a number of frames, or images. This number may depend on the computing power and/or the memory of a computer being used to obtain the background pixel map. In a preferred embodiment, the number may be at least 15 frames, while in a more preferred embodiment the background pixel map may be obtained over the previous 15 frames.

Figure 5:
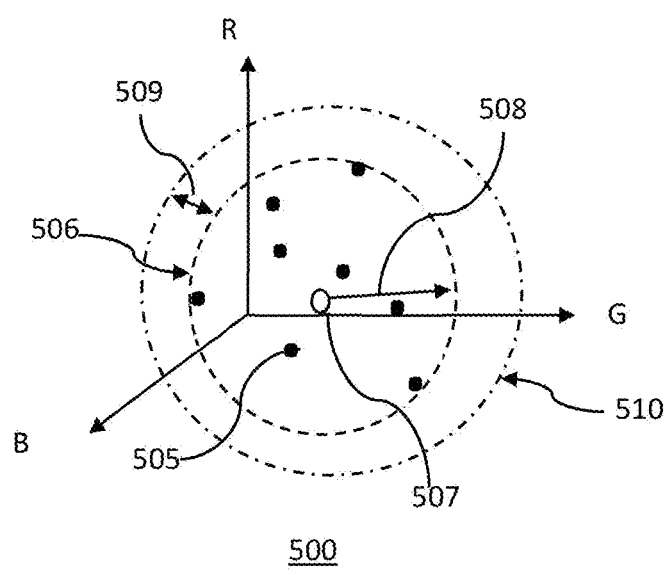
FIG. 5 shows a schematic representation of information related to a single pixel in a background pixel map of the present invention.

FIG. 5 shows a schematic representation 500 of information related to a single pixel in a background pixel map of the present invention.

Each pixel in the target location may be associated with a group of background pixels 505 having distinct color values such as their red, green, and blue values (RGB).

The background pixels associated with a given target location pixel may all fit within a smallest enclosing sphere 506. Finding the smallest enclosing sphere, also known as the minimum bounding sphere, for a set of points in space is a well-studied problem in computational geometry. There are different algorithms available to solve this problem efficiently. One commonly used algorithm is called the "Welzl's algorithm," based on the concept of recursive "shrink-wrapping." Welzl's algorithm has an expected linear time complexity, which makes it efficient for practical purposes. Other algorithms, such as the QuickHull algorithm or Ritter's algorithm, can also be used to solve the problem. These algorithms have different time complexities and may provide different trade-offs between efficiency and accuracy.

The smallest enclosing sphere 506 may have a radius 508 and be centered on a point 507.

There may also be a boundary sphere 510 that may be centered on the center point 507 of the smallest enclosing sphere, but have a radius that is larger by a range 509, i.e., the range 509 is the distance in RGB space separating the smallest enclosing sphere from the boundary sphere 510.

Figure 6:
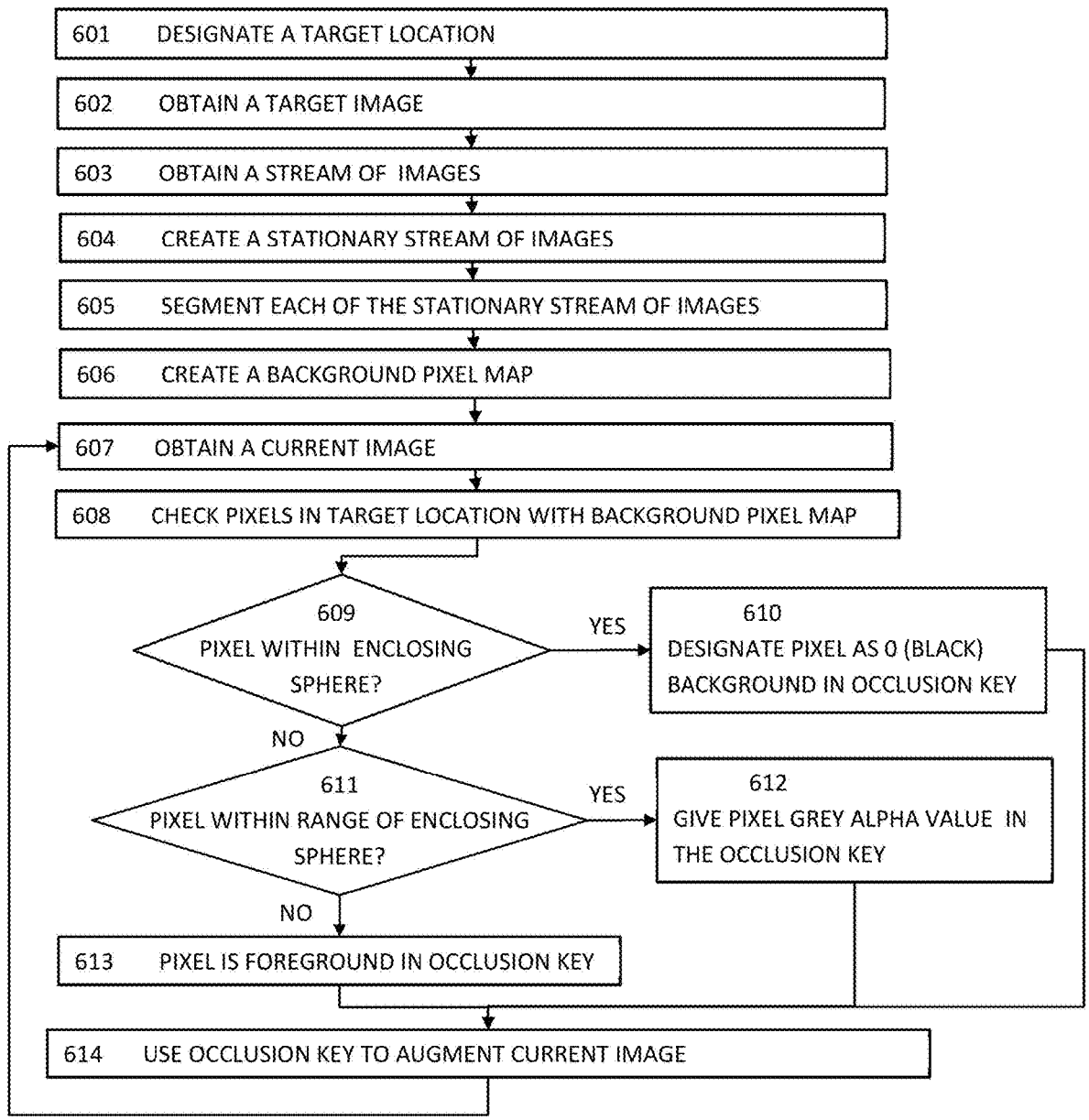
FIG. 6 is a flow chart showing representative steps of implementing one embodiment of the present invention.

FIG. 6 is a flow chart 600 showing representative steps of implementing one embodiment of the present invention.

In Step 601 "DESIGNATE A TARGET LOCATION" an operator may identify a location in an event venue deemed suitable for placing a virtual augmentation and designate it as a target location or region of interest.

In Step 602 "OBTAIN A TARGET IMAGE", the operator may obtain an image of the live venue using the broadcast video camera that suitably positions and sizes the target location. This digital image may be identified as the target image.

In Step 603 "OBTAIN A STREAM OF IMAGES" the system may obtain a stream of live or current images from the broadcast camera. This may be designated as a stream of current images.

In Step 604 "CREATE A STATIONARY STREAM OF IMAGES" the system may transform each of the images in the stream of current images into the camera pose used to obtain the target image. The transformation may, for instance, be accomplished using a current image to target image homography. Such an homography may be obtained using the methods described in detail above. The resultant stream of images may be designated as the stationary stream of images.

In Step 605 "SEGMENT EACH OF THE STATIONARY STREAM OF IMAGES" each of the images in stationary stream may be segmented into background and foreground pixels. This segmentation may, for instance, be performed using a neural network lightly trained to recognize foreground objects, as described in more detail above. The resultant images may be designated as the segmented image stream.

In 606 "CREATE A BACKGROUND PIXEL MAP", the segmented image stream may be used to create a background pixel map. In each of the segmented images, the individual pixels of the target location will all appear at the same x, y location. Over a period of time, or sequence of frames or images, each pixel of the region of interest may be represented as a background pixel. The RGB values of each of the representations of the pixel as a background pixel may then be stored to form the background pixel map, as discussed in more detail above.

In Step 607 "OBTAIN A CURRENT IMAGE" the system may be used to obtain a next frame or current image of an event occurring in the event location.

In Step 608 "CHECK PIXELS IN TARGET LOCATION WITH BACKGROUND PIXEL MAP" the pixels representing the target location in the current image will be checked against the background pixel map. To do this the current image needs to be transformed to match the pose of the target image used to create the background pixel map. This transformation may be accomplished using the current image to target image homography as described in more detail above.

The system may then move to Step 609 "PIXEL WITHIN ENCLOSING SPHERE?" in which each pixel in the target location is checked against the pixel color values associated with the corresponding pixel in the background pixel map. If the color values of the current pixel fall within the smallest enclosing sphere, the system may conclude that it is a background pixel and proceed to Step 610.

In Step 610 "DESIGNATE PIXEL AS 0 (BLACK) BACKGROUND IN OCCLUSION KEY" the corresponding pixel in the image occlusion key for the current image may be assigned a value of 0 or black. This may indicate that it is a background pixel, and the corresponding pixel of a virtual augmentation should be displayed rather than the background pixel.

If in Step 609, the pixel is found to not be in the smallest enclosing sphere, the system may proceed to step 611.

In Step 611 "PIXEL WITHIN RANGE OF ENCLOSING SPHERE'?" the system may check whether or not the color value of a pixel in the target location of the current image falls within a bounding or enclosing sphere. The bounding or enclosing sphere may be a sphere centered on the smallest enclosing sphere but has a radius that is slightly larger. The separation between the bounding sphere and the smallest enclosing sphere may, for instance, be 5% of the radius of the smallest enclosing sphere. If the color value of the pixel is within the enclosing sphere, the system may conclude that there is some uncertainty as to whether the pixel is a background or foreground pixel and proceed to Step 612.

In Step 612 "GIVE PIXEL GREY ALPHA VALUE IN THE OCCLUSION KEY", the system may assign a grey alpha value to corresponding pixel in the image occlusion key. This value may, for instance, be between 1 and 254 and may allow a percentage of the background pixel to be merged with the foreground pixel. The pixel in the occlusion key may effectively be semi-transparent. The degree of transparency may, for instance, be proportional to the distance in RGB space of the pixel in the current image from the RGB value of the smallest enclosing sphere. The degree of transparency may reflect the degree of uncertainty as to whether or not the pixel is a background or foreground pixel.

If in Step 611, the pixel value is not within the range of the enclosing sphere, the system may conclude that the pixel is a foreground pixel and may proceed to Step 613.

In Step 613 "PIXEL IS FOREGROUND IN OCCLUSION KEY" the system may assign the corresponding pixel in the image occlusion key a value of 255 or white, indicating that the corresponding pixel in the virtual augmentation should not be displayed.

Steps 608 through 613 may be repeated until all the current image pixels in the target location have been evaluated and a complete image occlusion key for the current image has been obtained.

In Step 614 "USE OCCLUSION KEY TO AUGMENT CURRENT IMAGE" the occlusion key obtained for the current image may be transformed back to the image pose of the current image. This may, for instance, be accomplished using the homography from the target image back to the current image. Once transformed back to the correct image pose, the occlusion key may be used to augment the current image with a virtual image.

Having performed the augmentation, the system may proceed back to step 607 to obtain the next current image.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A method of generating an image occlusion key, comprising:
   obtaining a target image of an event venue using a digital camera, said target image having a target location suitable for placing a virtual augmentation;
   obtaining a stream of current images from said event venue;
   creating a stationary-stream of said current images, said stationary-stream of images having each of said stream of current images transformed to match camera-pose attributes of said target image such that each pixel representing said target location occurs at the same x, y location in each of said stationary stream of images;
   creating a segmented image stream from said stationary stream, wherein, each image of said segmented image stream is segmented into foreground and background pixels;
   combining said background pixels of said segmented image stream to obtain a background pixel map of said target location said background pixel map having, for each pixel of said target region, a history of color values labeled as being one of said background pixels, and further associating each pixel within said target location with color values of all pixels designated as background pixels at that pixel location in each image of said segmented image stream, and, wherein, all pixels in said target location of one of said current images that have values within a smallest enclosing sphere of said color values of pixels associated with the corresponding pixel from the background pixel map are designated as background pixels in said occlusion key, and therefore, assigned a value of one or fully transparent in said occlusion key; and, using said background pixel map to obtain said image occlusion key for one of said current images.

2. A method of generating an image occlusion key, comprising:

obtaining a target image of an event venue using a digital camera, said target image having a target location suitable for placing a virtual augmentation;

obtaining a stream of current images from said event venue;

creating a stationary-stream of said current images, said stationary-stream of images having each of said stream of current images transformed to match camera-pose attributes of said target image such that each pixel representing said target location occurs at the same x, y location in each of said stationary stream of images;

creating a segmented image stream from said stationary stream, wherein, each image of said segmented image stream is segmented into foreground and background pixels;

combining said background pixels of said segmented image stream to obtain a background pixel map of said target location said background pixel map having, for each pixel of said target region, a history of color values labeled as being one of said background pixels, and further associating each pixel within said target location with color values of all pixels designated as background pixels at that pixel location in each image of said segmented image stream, and, wherein all pixels in said target location of one of said current images that have color values within a predetermined range of the smallest enclosing sphere of the color values of pixel values associated with the corresponding pixel from the background pixel map are assigned an alpha value in a range of 1 to 254 proportional to their distance from the smallest enclosing sphere; and, using said background pixel map to obtain said image occlusion key for one of said current images.

3. The method of claim 2, wherein, said range is within 5%.

4. A system of generating an image occlusion key, comprising:

a camera located at a fixed location at an event venue;

a programable digital computer functionally connected to said camera;

designating by an operator a target location within an event venue, said target location being an area deemed suitable for augmenting with a virtual augmentation;

obtaining by said operator using said camera, a target image of said target location; and, said computer being programmed to perform the functions of:

obtaining a stream of current images of said event venue using said camera;

creating a stationary-stream of from said current images, said stationary stream having each of said stream of current images transformed to match camera-pose attributes of said target image such that each pixel representing said target location occurs at the same x, y location in each of said stationary stream of images;

creating a segmented image stream from said stationary-stream wherein each image of said segmented image stream is segmented into foreground and background pixels;

combining said background pixels of said segmented image stream to obtain a background pixel map of said target location said background pixel map having, for each pixel of said target region, a history of color values labeled as being one of said background pixels, and, wherein, combining said segmented image stream to obtain said background pixel map further comprises associating each pixel within said target location with color values of all pixels designated as background pixels at that pixel location in each image of said segmented image stream; and, wherein, all pixels in said target location of one of said current images that have values within a smallest enclosing sphere of said color values of pixels associated with the corresponding pixel from the background pixel map are designated as background pixels in said occlusion key, and therefore, assigned a value of one or fully transparent in said occlusion key; and, using said background pixel map to obtain said image occlusion key for one of said current images.

5. A system of generating an image occlusion key, comprising:

a camera located at a fixed location at an event venue;

a programable digital computer functionally connected to said camera;

designating by an operator a target location within an event venue, said target location being an area deemed suitable for augmenting with a virtual augmentation;

obtaining by said operator using said camera, a target image of said target location; and, said computer being programmed to perform the functions of:

obtaining a stream of current images of said event venue using said camera;

creating a stationary-stream of from said current images, said stationary stream having each of said stream of current images transformed to match camera-pose attributes of said target image such that each pixel representing said target location occurs at the same x, y location in each of said stationary stream of images;

creating a segmented image stream from said stationary-stream wherein each image of said segmented image stream is segmented into foreground and background pixels;

combining said background pixels of said segmented image stream to obtain a background pixel map of said target location said background pixel map having, for each pixel of said target region, a history of color values labeled as being one of said background pixels, and, wherein, combining said segmented image stream to obtain said background pixel map comprises associating each pixel within said target location with color values of all pixels designated as background pixels at that pixel location in each image of said segmented image stream; and, wherein all pixels in said target location of one of said current images that have color values within a predetermined range of the smallest enclosing sphere of the color values of pixel values associated with the corresponding pixel from the background pixel map are assigned an alpha value in a range of 1 to 254 proportional to their distance from the smallest enclosing sphere; and, using said background pixel map to obtain said image occlusion key for one of said current images.

6. The method of claim 5, wherein said range is withing 5%.

\* \* \* \* \*